United States Patent
Sudo et al.

(10) Patent No.: US 7,201,980 B2
(45) Date of Patent: Apr. 10, 2007

(54) FUEL CELL APPARATUS AND METHOD FOR FEEDING A FUEL FOR FUEL CELL

(75) Inventors: Go Sudo, Kanagawa (JP); Kenji Katori, Kanagawa (JP); Masahiko Tahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/563,508

(22) PCT Filed: Jun. 30, 2004

(86) PCT No.: PCT/JP2004/009609

§ 371 (c)(1),
(2), (4) Date: Jan. 5, 2006

(87) PCT Pub. No.: WO2005/004270

PCT Pub. Date: Jan. 13, 2005

(65) Prior Publication Data

US 2006/0159968 A1   Jul. 20, 2006

(30) Foreign Application Priority Data

Jul. 7, 2003   (JP) ............................ 2003-271581

(51) Int. Cl.
*H01M 8/04* (2006.01)
(52) U.S. Cl. .............................. 429/13; 429/22; 429/34
(58) Field of Classification Search ................. 429/13, 429/22, 34
See application file for complete search history.

(56) References Cited

U.S. PATENT DOCUMENTS

| | | | |
|---|---|---|---|
| 2002/0086193 A1 | 7/2002 | Acker et al. | |
| 2003/0031907 A1* | 2/2003 | Gottesfeld | 429/30 |
| 2004/0013928 A1 | 1/2004 | Yamauchi et al. | |

FOREIGN PATENT DOCUMENTS

| | | |
|---|---|---|
| JP | 2003-022830 | 1/2003 |
| JP | 2003-132924 | 5/2003 |
| JP | 2003-217643 | 7/2003 |
| JP | 2003-297401 | 10/2003 |
| JP | 2003-331885 | 11/2003 |
| JP | 2004-164954 | 6/2004 |

* cited by examiner

*Primary Examiner*—Gregg Catelmo
(74) *Attorney, Agent, or Firm*—Bell, Boyd & Lloyd LLP

(57) ABSTRACT

Fuel cell apparatus and method for feeding a fuel for fuel cell. Optimal power generation for the output demanded by a fuel cell can be achieved. A fuel mixer can adjust the methanol concentration of a mixed solution, and it adjusts the concentration of the mixed solution to an optimal methanol concentration for a load. Information on the methanol concentration detected by a concentration sensor is sent to a controller and referred to when the fuel mixer adjusts the methanol concentration of the mixed solution. The concentration sensor 115 provided immediately before the fuel cell can achieve power generation while detecting the substantial methanol concentration of the mixed solution fed to the fuel cell.

7 Claims, 4 Drawing Sheets

FUEL CELL APPARATUS AND METHOD FOR FEEDING A FUEL FOR FUEL CELL

CROSS REFERENCE TO RELATED APPLICATIONS

The present application claims priority to Japanese Patent Document No. P2003-271581 filed on Jul. 7, 2003, the disclosure of which is herein incorporated by reference.

The present invention relates to a fuel cell apparatus which can achieve optimal power generation for the output mode demanded. More particularly, the present invention is concerned with a fuel cell apparatus which can optimize the concentration of a mixed solution as a fuel according to the output mode demanded, and a method for feeding a fuel for fuel cell.

A fuel cell is a power generation apparatus that generates electric power using a fuel fed to a fuel electrode and air containing oxygen as an oxidizer fed to an air electrode, and the fuel cell causes only water as a by-product of the power generation and hence recently has attracted attention as a clean generator.

As an example of the fuel cell, a direct methanol fuel cell (DMFC) is known such that methanol is directly fed to the fuel cell to generate electric power. In the power generation by the DMFC, only methanol fed as a fuel cannot advance an anodic reaction in the fuel cell, and hence a mixed solution of methanol and water is fed to the anode in the fuel cell to achieve power generation.

As a method for feeding a mixed solution of methanol and water to the DMFC, a method has conventionally been known in which a mixed solution of methanol and water having an appropriate composition is preliminarily prepared and fed to the DMFC while keeping constant the concentration of the mixed solution. A method is also used in which a circulating system for circulating the mixed solution is formed and the mixed solution is circulated in the circulating system while controlling the mixed solution to have an appropriate concentration by feeding pure methanol to make up for the mixed solution from which methanol is consumed by power generation and recovering water formed at the cathode in the DMFC.

The method in which methanol and water are preliminarily mixed can simplify the system of the DMFC; however, the energy density of the fuel is lowered. When the methanol concentration of the mixed solution is increased for obtaining a larger energy density, the membrane and electrode assemblies (MEA) constituting the DMFC deteriorate sooner.

Further, it is known that the methanol concentration at which the maximum output can be obtained and the methanol concentration at which the maximum efficiency can be obtained are different, and the method using the mixed solution of methanol and water preliminarily prepared cannot change the methanol concentration depending on the operation conditions of the DMFC.

On the other hand, in the method in which water formed at the cathode in the DMFC is recovered and mixed with methanol, generally, a process is employed such that the methanol concentration of the mixed solution is maintained so that the maximum output of the DMFC is obtained, and the fuel cell and a secondary battery are used in combination to deal with changes of the load of the fuel cell. Therefore, when using a process such that the methanol concentration is controlled so that the maximum efficiency is obtained to achieve power generation, not only can the maximum output not be obtained, but also it is difficult to control the mixed solution as a fuel to have an optimal methanol concentration for the output demanded by the fuel cell. For obtaining the output characteristics and power generation efficiency characteristics of the fuel cell as excellent as possible, it is desired that the concentration of the mixed solution as a fuel is changed according to the type of the output demanded by the fuel cell.

In view of the above problems, the present invention has been achieved, and a task is to provide a fuel cell apparatus which can achieve optimal power generation for the output demanded by a fuel cell.

More specifically, a task is to provide a fuel cell apparatus which can optimize the concentration of a mixed solution according to the state of the load of a fuel cell to achieve power generation, and a method for feeding a fuel for fuel cell.

The fuel cell apparatus of the present invention is characterized in that the apparatus includes a fuel cell for generating electric power using a liquid fuel; and a concentration adjusting means for adjusting the concentration of the liquid fuel to an optimal concentration according to the output mode demanded by the fuel cell. In the fuel cell apparatus of the present invention, the liquid fuel having a concentration adjusted to an optimal concentration according to the output mode can be fed to the fuel cell. The operation of the fuel cell at an optimal concentration enables, for example, power generation using the liquid fuel having a concentration adjusted so that the maximum power generation efficiency is obtained in a general state and power generation using the liquid fuel having an appropriately adjusted concentration when the maximum output is needed.

In the fuel cell apparatus of the present invention, the concentration adjusting means can reuse the liquid fuel, which has been used in the fuel cell for power generation, to adjust the concentration of the liquid fuel, thus achieving effective utilization of the materials for the power generation.

In the fuel cell apparatus of the present invention, the concentration adjusting means may include a plurality of fuel mixing means which form, respectively, liquid fuels each having a predetermined concentration. When the fuel mixing means respectively form liquid fuels individually having an optimal concentration for each output mode, a desired fuel mixer can be selected according to the demanded output mode to feed the liquid fuel to the fuel cell from the fuel mixer selected.

The fuel cell apparatus of the present invention may further include a concentration detecting means for detecting the concentration of the liquid fuel. For example, when the concentration detecting means is provided at the fuel mixing means, the concentration of the liquid fuel formed in the fuel mixer can be accurately detected and controlled. The concentration detecting means may be provided between the fuel cell and the fuel mixing means, making it possible to more accurately detect the substantial concentration of the liquid fuel consumed by the fuel cell.

The method for feeding a fuel for fuel cell of the present invention is characterized by including detecting an output mode demanded by a fuel cell for generating electric power using a liquid fuel, and adjusting the concentration of the liquid fuel to an optimal concentration according to the output mode. By the method for feeding a fuel for fuel cell of the present invention, the liquid fuel having an optimal concentration for the output mode demanded by the fuel cell can be fed.

Additional features and advantages of the present invention are described in, and will be apparent from, the following Detailed Description and the figures.

DETAILED DESCRIPTION

Hereinbelow, the fuel cell apparatus and the method for feeding a fuel for fuel cell of the present invention will be described. The concept of the present invention by the present inventors is first described with reference to FIGS. 1 and 2.

Figure 1:
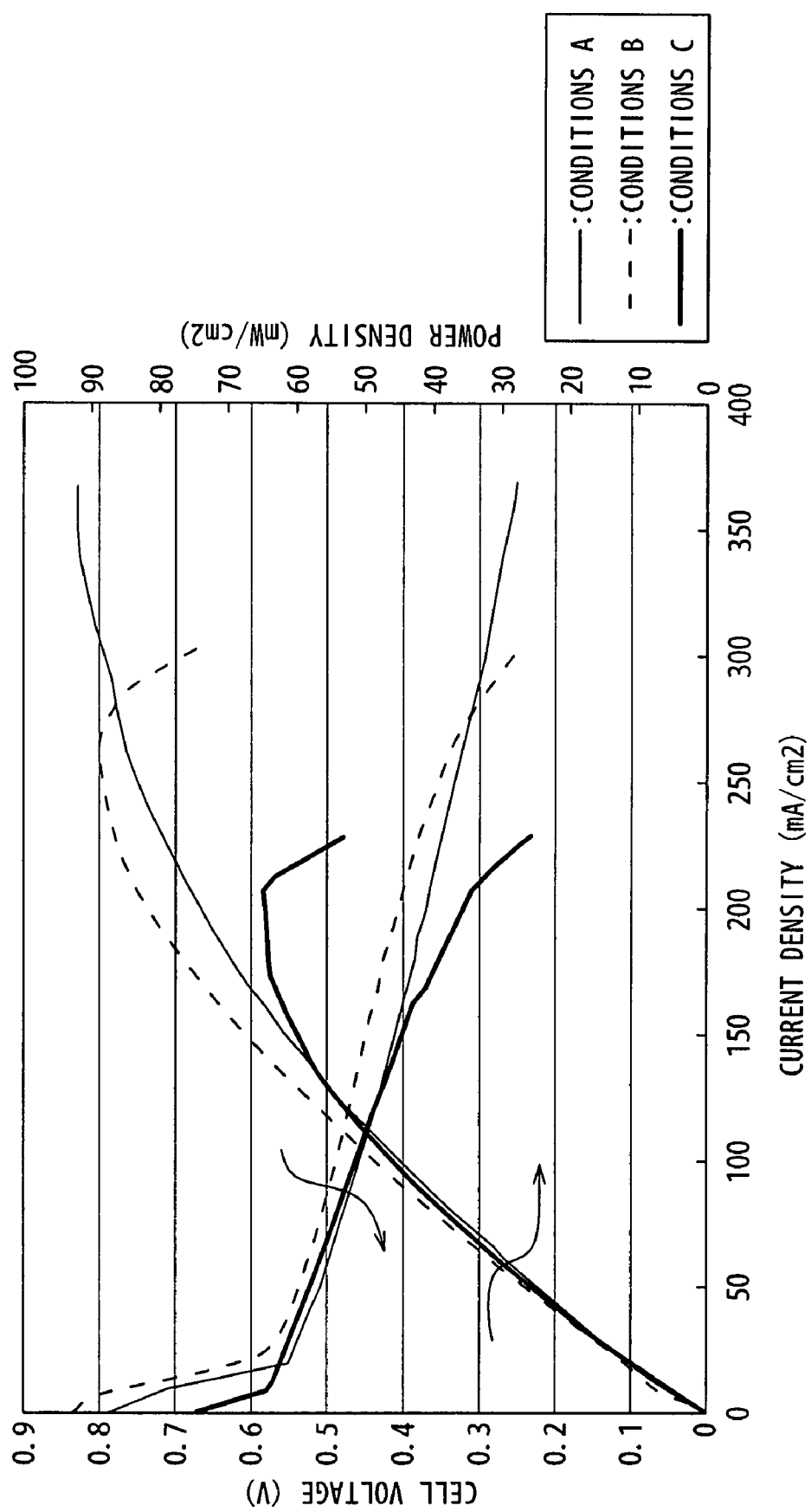
FIG. 1 is a graph showing the characteristics of a fuel cell, i.e., the relationship between a current density and a cell voltage or a power density.

FIG. 1 is a graph showing the relationship between the methanol concentration and the fuel cell characteristics in power generation of a DMFC conducted by the present inventors. In FIG. 1, a current density is taken as the abscissa, and a cell voltage of the power generating cell constituting the DMFC is taken as the left-hand ordinate. A power density of the DMFC is taken as the right-hand ordinate. Under three types of conditions such that the mixed solutions as a fuel having a methanol concentration of 1.0 mol/L, 0.6 mol/L, or 0.4 mol/L are used, with respect to each methanol concentration, the relationship between a current density and a cell voltage or a power density is determined. Hereinafter, the conditions for methanol concentration (1.0, 0.6, and 0.4 mol/L) are respectively referred to as "conditions A", "conditions B", and "conditions C".

As seen in FIG. 1, with respect to each of the conditions A, B, and C, the cell voltage tends to lower as the current density increases. The power density increases as the current density increases, but the increase rate of the power density against the current density tends to be small as the current density increases. The power density tends to be maximum at a specific value of the current density. With respect to the conditions A, the power density has no maximum value in the range of the current density in this evaluation, but the increase rate of the power density tends to be small as the current density increases.

Figure 2:
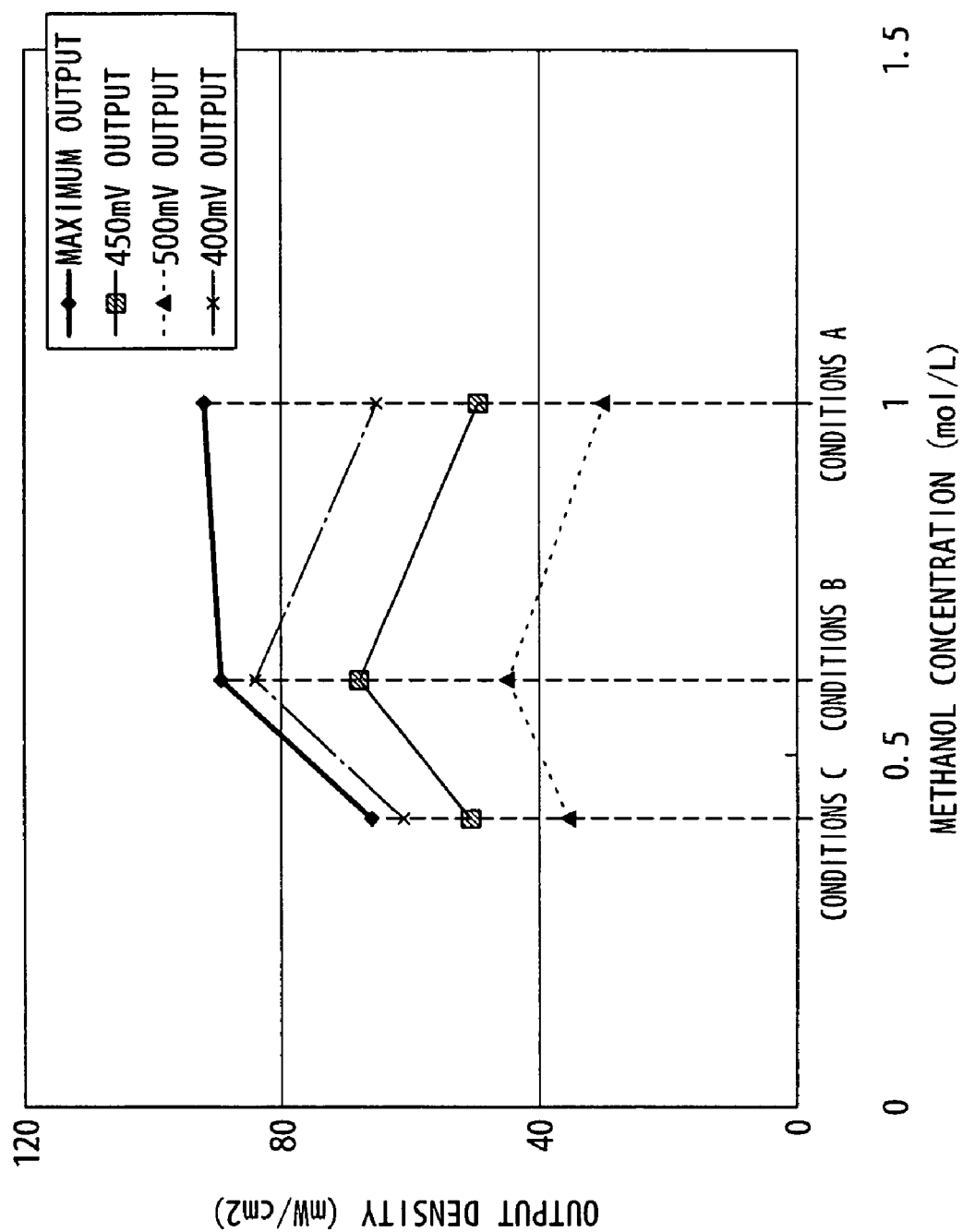
FIG. 2 is a graph showing the relationship between a methanol concentration and an output density.

FIG. 2 is a graph showing the relationship between the maximum output density obtained from the characteristic curves shown in FIG. 1 for the cell voltage and power density of the DMFC and the output density at a constant cell voltage. In FIG. 2, with respect to each of four parameters of maximum output, 450 mV output, 500 mV output, and 400 mV output, the output density values are plotted on a graph against the methanol concentration.

With respect to the power generating cell used in this evaluation, it is found that, in the operation of the power generating cell at an output density of about 40 to 70 mW/cm$^2$, a high output density can be obtained when the methanol concentration is adjusted to being about 0.6 mol/L, as compared to the output density at the same cell voltage obtained when the methanol concentration is 1.0 or 0.4 mol/L. In other words, it is found that there is present the optimal methanol concentration at which the output density demanded by the power generating cell can be obtained most efficiently. The cell voltage is 450 to 500 mV at an output density of about 40 to 70 mW/cm$^2$, which is advantageous when the load connected to the power generating cell is relatively small or a secondary battery is charged. That is, the power generation at an optimal methanol concentration for the power output demanded can increase the power generation efficiency. On the other hand, when the load demanded by the power generating cell is large, by adjusting the methanol concentration to being about 1 mol/L, an output of 90 mW/cm$^2$ or more can be obtained. Thus, the fuel tends to have an optimal methanol concentration for the output mode demanded by the DMFC, and it is clear that adjustment of the fuel concentration according to the output mode demanded is essential to efficient power generation. The output mode in the present specification means demands from the load including qualitative characteristics of the power generating cell, such as output voltage or output power, and specific conditions for individual characteristics, such as a maximum or a specific range.

Figure 3:
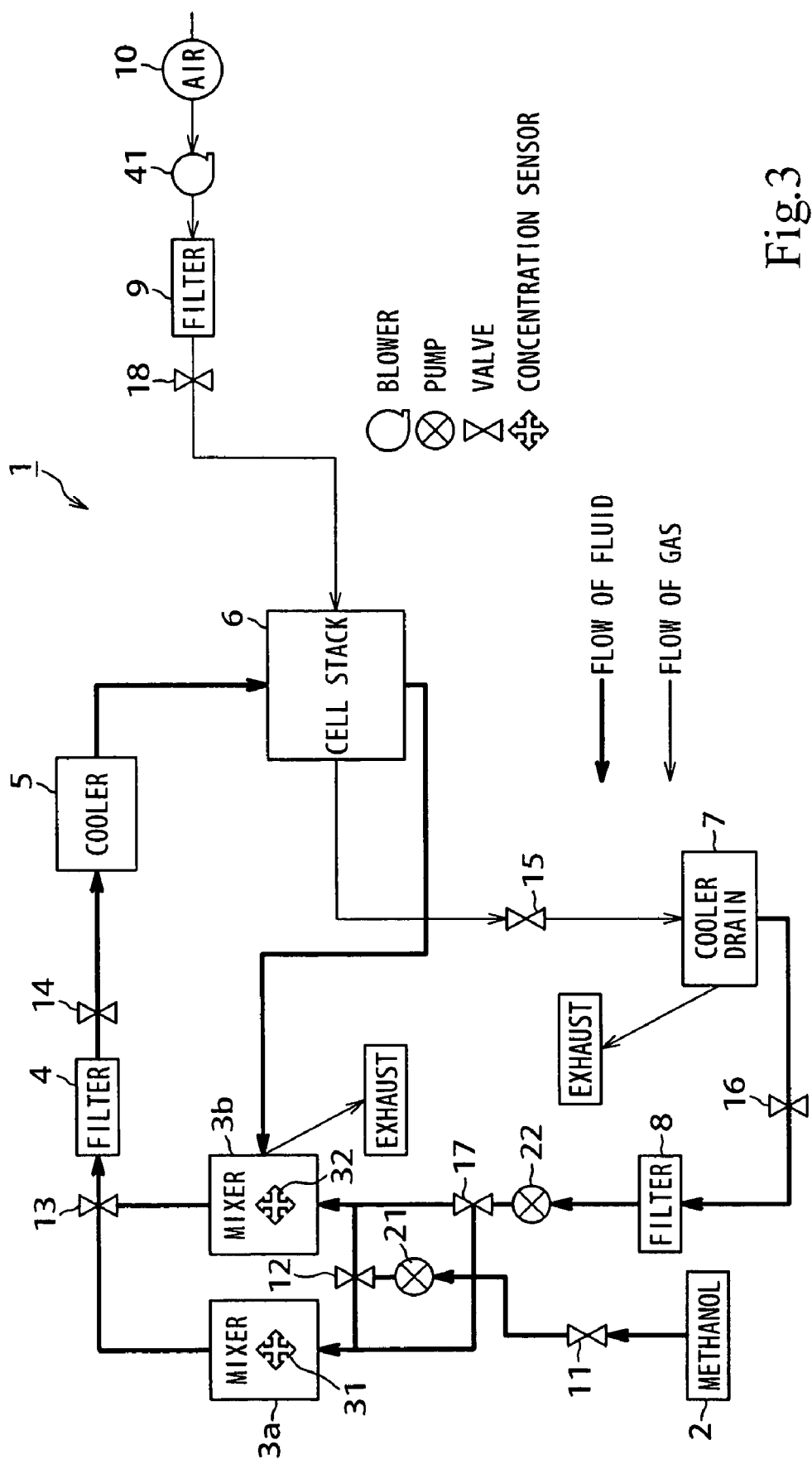
FIG. 3 is a view showing the construction of an example of the fuel cell apparatus of the present invention.

Next, an example of the fuel cell apparatus of the present invention is described. FIG. 3 is a view showing the construction of the fuel cell apparatus in the present example. The fuel cell apparatus of the present invention is constructed based on the above-mentioned basic concept of the present invention, and has a mechanism capable of adjusting the methanol concentration of a mixed solution as a fuel according to the output mode demanded by a fuel cell. A fuel cell apparatus 1 in the present example is a direct methanol fuel cell, but the fuel is not limited to methanol, and the fuel cell apparatus may be of any type as long as it is a fuel cell that generates electric power using a liquid fuel.

The fuel cell apparatus 1 includes a methanol tank 2, mixers 3a, 3b, valves 11, 12, 13, 14, 15, 16, 17, 18, pumps 21, 22, filters 4, 8, 9, a cooler 5, a cell stack 6, a cooler drain 7, a blower 41, and a pipe connecting the above portions to form a flow channel for fluid.

The operation of the fuel cell apparatus 1 in which a mixed solution is fed to the cell stack 6 is first described below. The pump 21 pumps methanol from the methanol tank 2 in a state such that the valve 11 is opened, and feeds the methanol to the mixers 3a, 3b. The mixers 3a, 3b have concentration sensors 31, 32, respectively, which monitor the methanol concentration of the mixed solution. As described below, gas containing moisture is discharged through the discharge outlet of the cell stack 6 on the air electrode side, and the moisture separated from the gas is fed to the mixers 3a, 3b, thus adjusting the methanol concentration of the mixed solution. Alternatively, moisture can be separately fed to the mixers 3a, 3b. Monitoring the methanol concentrations by the concentration sensors 31, 32 enables accurate control of the concentration of the mixed solution.

The mixers 3a, 3b individually form mixed solutions having different concentrations adjusted, and feed a mixed solution having a desired methanol concentration to the cell stack 6. The desired methanol concentration means an optimal methanol concentration for the output mode demanded by the cell stack 6, and, for example, when the cell stack 6 includes the power generating cell used in the above evaluation, the mixer 3a forms a mixed solution having an adjusted methanol concentration of 0.6 mol/L. The mixer 3b forms a mixed solution having an adjusted methanol concentration of 1 mol/L. When the output density demanded by the cell stack 6 is about 70 mW/cm$^2$, the mixed solution having a methanol concentration of 0.6 mol/L is fed to the cell stack 6 from the mixer 3a. When the output density demanded by the cell stack 6 is 90 mW/cm$^2$ or more, the mixed solution having a methanol concentration of 1 mol/L is fed to the cell stack 6 from the mixer 3b. In other words, by switching the mixers 3a, 3b for supplying the mixed solution to the cell stack 6 according to the output density demanded by the cell stack 6, a mixed solution having an optimal methanol concentration adjusted according to the output mode demanded by the stacked cell 6 can be fed.

The flow channel connecting the mixers 3a, 3b and the cell stack 6 is provided with the valve 13, filter 4, valve 14, and cooler 5, and the flow channel is secured in a state such that the valves 13, 14 are opened. Impurities are removed by the filter 4 from the mixed solution fed from the mixers 3a, 3b, and then the resultant mixed solution has a temperature lowered by the cooler 5 and is fed to the cell stack 6.

Next, the operation of the fuel cell apparatus in which the cell stack takes in air is described. The flow channel, through which the cell stack takes in air, is provided with the blower 41, filter 9, and valve 18, and impurities are removed by the filter 9 from the air taken in through the blower 41, and then the resultant air is fed to the cell stack 6 through the valve 18.

Next, the operation of the fuel cell apparatus 1 is described in which the mixed solution which has been used for the power generation is discharged from the fuel electrode side of the cell stack. The cell stack 6 feeds the mixed solution which has been used for the power generation to the mixer 3b. This mixed solution is reused for forming a mixed solution to be fed to the cell stack 6 from the mixer 3b. The concentration sensor 32 provided at the mixer 3b monitors the methanol concentration of the mixed solution in the mixer 3b, and the mixer 3b can control the flow rate of the moisture or fuel fed to the mixer 3b so that the methanol concentration of the mixed solution in the mixer 3b becomes a predetermined value.

Next, the operation of the fuel cell apparatus 1 is described in which air is discharged from the oxygen electrode side of the cell stack 6. The cell stack 6 discharges air which has been used for the power generation from the discharge outlet on the oxygen electrode side, and feeds the air to the cooler drain 7 through the flow channel which is secured in a state such that the valve 15 is opened. The cooler drain 7 separates moisture from the air for reusing the moisture in adjustment of the concentrations of the mixed solutions in the mixers 3a, 3b, and feeds the moisture to the filter 8 through the valve 16. The cooler drain 7 discharges the air from which moisture has been separated. The filter 8 removes impurities from the moisture separated by the cooler drain, and then feeds the resultant moisture to the mixers 3a, 3b through the pump 22 and valve 17. The flow of the air and moisture from the cell stack 6 through the mixers 3a, 3b is made by the actuating force caused by the pump 22.

As seen in the above description of the sequence of operations of the fuel cell apparatus 1, in the fuel cell apparatus 1 in the present example, the mixers 3a, 3b individually feed the mixed solutions each having a predetermined methanol concentration adjusted to the cell stack 6, and the fuel or moisture contained in the mixed solution or gas discharged from the cell stack 6 can be reused. Even when the output mode demanded by the cell stack 6 is often changed, appropriately switching the mixers for supplying the mixed solutions to the cell stack 6 makes it possible to feed an optimal mixed solution for the demanded output mode to the cell stack. When the maximum efficiency operation and the maximum output operation for the cell stack 6 are often switched, methanol or water is frequently added for adjusting the methanol concentration of the mixed solution, so that overflow may occur in the circulating system through which the mixed solution flows. However, in the circulating system constituting the fuel cell apparatus 1 in the present example, overflow can be avoided without increasing the capacities of the mixers 3a, 3b more excessively than needed.

Figure 4:
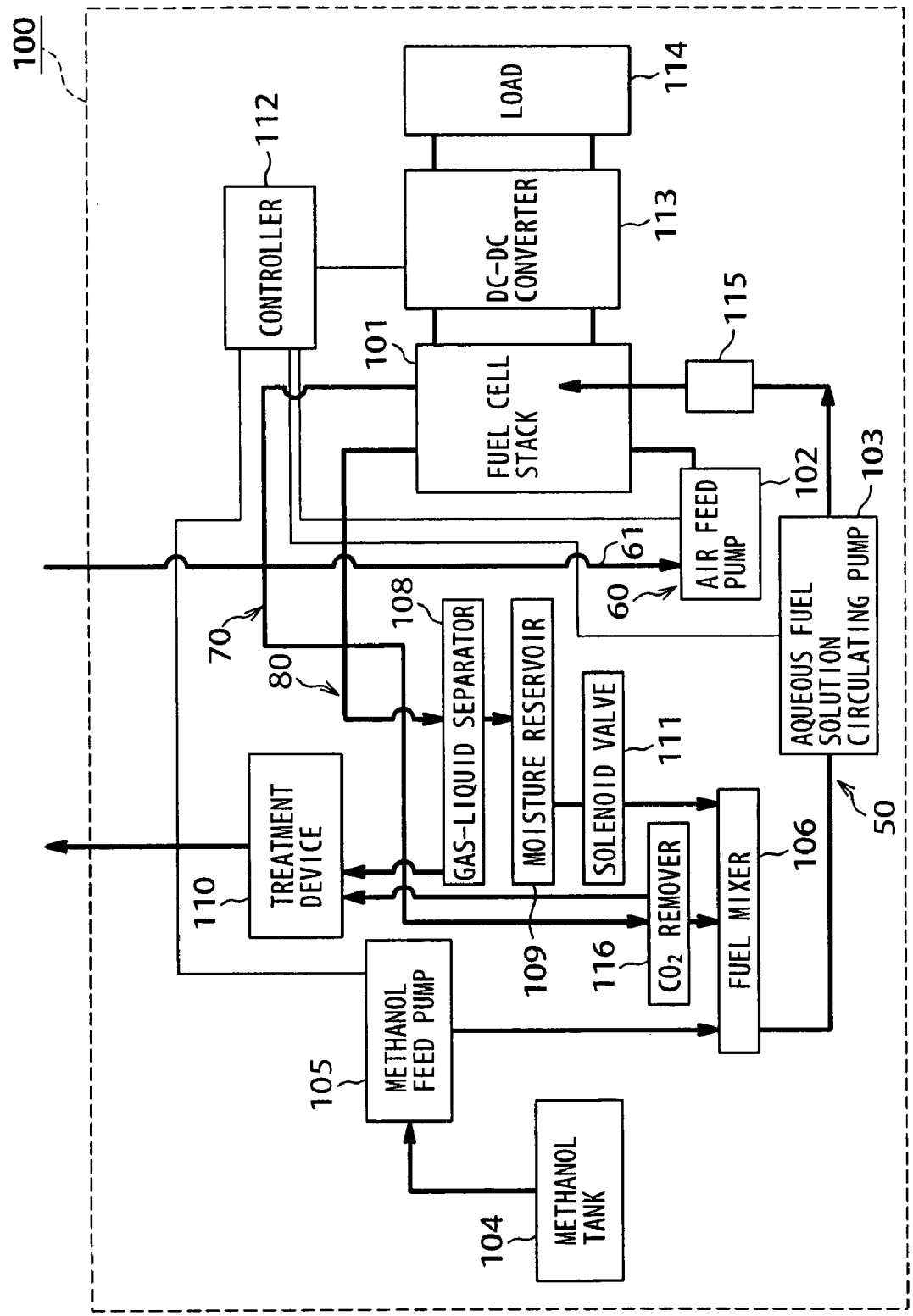
FIG. 4 is a view showing the construction of an example of the fuel cell apparatus of the present invention.

Another example of the fuel cell apparatus of the present invention is described below. FIG. 4 is a view showing the construction of the fuel cell apparatus in the present example. The operation of a fuel cell apparatus 100 as well as the flow of air and fuel through the fuel cell apparatus 100 which is a DMFC are described.

The fuel cell apparatus 100 includes a fuel cell 101, a fuel electrode-side feed pipeline 50 through which a fuel is fed to a fuel electrode in the fuel cell 101, an air electrode-side feed pipeline 60 through which air as an oxidizer is fed to the fuel cell 101, a fuel electrode-side discharge pipeline 70 through which a product of the power generation is discharged from the fuel electrode side of the fuel cell 101, and an air electrode-side discharge pipeline 80 for exhaust from the air electrode side of the fuel cell. A DC-DC converter 113 connected to the fuel cell 101 and a load 114 connected to the DC-DC converter 113 take electric power from the fuel cell 101. A controller 112 controls the actions of individual elements constituting the fuel cell apparatus 100.

The fuel cell 101 has a stacked structure having power generating cells stacked on one another wherein each power generating cell comprises an electrolyte membrane sandwiched between an air electrode and a fuel electrode. The electrolyte membrane is a solid polymer electrolyte membrane widely used in direct methanol fuel cells, and, for example, an ionic conductive membrane having a fluororesin can be used.

The fuel electrode-side feed pipeline 50 includes a methanol tank 104, a methanol feed pump 105 for pumping methanol from the methanol tank 104, a fuel mixer 106 for forming a mixed solution of the methanol fed from the methanol feed pump 105 and moisture, an aqueous fuel solution circulating pump 103 for feeding the mixed solution received from the fuel mixer 106 to the fuel cell 101, and a concentration sensor 115 provided at a flow channel between the fuel cell 101 and the aqueous fuel solution circulating pump 103.

The air electrode-side feed pipeline 60 includes a pipe 61 for taking air from the outside of the fuel cell apparatus 100, and an air feed pump 102 for feeding air to the fuel cell 101.

The fuel electrode-side discharge pipeline 70 includes a carbon dioxide remover 116 for removing carbon dioxide contained in the mixed solution discharged from the fuel cell 101, and a treatment device 110 for discharging the exhaust, from which carbon dioxide has been removed, out of the fuel cell apparatus 100.

The air electrode-side discharge pipeline 80 includes a gas-liquid separator 108 for separating moisture from the exhaust discharged from the fuel cell 101, a moisture reservoir 109 for storing therein the moisture separated, a solenoid valve 111 provided at a flow channel from the moisture reservoir 109 through the fuel mixer 106, and a treatment device 110 for discharging the exhaust, from which moisture has been separated by the gas-liquid separator 108, out of the fuel cell apparatus 100. The treatment device 110 is involved in both the fuel electrode-side discharge pipeline 70 and the air electrode-side discharge pipeline 80.

Next, the operation of the fuel cell apparatus 100 in the present example is described. The operation is first described in which a mixed solution as a fuel is circulated to the fuel cell apparatus 100.

The methanol feed pump 105 pumps methanol from the methanol tank 104 and feeds the methanol to the fuel mixer 106. The aqueous fuel solution circulating pump 103 feeds the mixed solution to the fuel cell 101 from the fuel mixer 106 for mixing methanol and moisture to form a mixed solution. The fuel mixer 106 can adjust the methanol concentration of the mixed solution, and it adjusts the concentration of the mixed solution to an optimal methanol concentration for the load 114. Information on the methanol concentration detected by the concentration sensor 115 is sent to the controller and referred to when the fuel mixer 106 adjusts the methanol concentration of the mixed solution. The concentration sensor 115 is provided immediately before the fuel cell 101, that is, provided between the fuel mixer 106 and the fuel cell 101, and hence, even when the concentration changes, the substantial methanol concentration of the mixed solution consumed by the fuel cell 101 can be detected, thus enabling power generation using the mixed solution having a concentration adjusted to the output mode with high accuracy.

The mixed solution consumed by the fuel cell 101 is circulated to the fuel mixer 106 which serves also as a carbon dioxide remover, and fed again to the fuel cell 101 by the aqueous fuel solution circulating pump 103. The fuel mixer 106, which serves also as a carbon dioxide remover, separates carbon dioxide from the mixed liquid discharged from the fuel cell 101 and feeds the resultant mixed liquid to the treatment device 110, and the treatment device 110 discharges carbon dioxide to the atmosphere. In the fuel cell apparatus using a liquid fuel, such as methanol, the mixed solution itself functions as a cooling medium for the fuel cell, and hence the fuel cell apparatus 100 needs no additional cooling flow channel. Therefore, temperature elevation of the fuel cell 101 can be suppressed without additionally flowing cooling water through the fuel cell apparatus 100. Further, in the fuel cell apparatus using a liquid fuel like the fuel cell apparatus 100 in the present example, the mixed solution itself has incompressibility, leading to an advantage in that the fuel cell apparatus rarely needs a back pressure regulating valve, as compared to a fuel cell apparatus using a gaseous fuel, such as hydrogen gas.

The fuel cell 101 feeds the mixed solution which has been used for the power generation to the carbon dioxide remover, and the mixed solution, from which carbon dioxide has been removed by the carbon dioxide remover 116, is reused for forming a mixed solution having a predetermined methanol concentration by the fuel mixer 106. When the mixed solution which has been used for the power generation contains moisture, the moisture is mixed with methanol by the fuel mixer 106 and reused for the power generation of the fuel cell 101. Accordingly, methanol or moisture contained in the fluid discharged from the fuel cell 101 is reused, thus enabling the power generation to efficiently utilize a fuel, such as methanol, or moisture. In the fuel electrode-side feed pipeline 50 and the fuel electrode-side discharge pipeline 70, the actuating force caused by the aqueous fuel solution circulating pump 103 can force the mixed solution to flow.

Next, the operation of the fuel cell apparatus 100 is described in which air is circulated through the air electrode-side feed pipeline 60 and air electrode-side discharge pipeline 80.

The air feed pump 102 takes in air as an oxidizer from the atmosphere through the pipe 61, and feeds the air to the fuel cell 101. The air, which has been used for the power generation of the fuel cell 101, is separated from moisture by the gas-liquid separator 108, and discharged to the atmosphere through the treatment device 110. The moisture separated from the air discharged from the fuel cell 101 is stored in the moisture reservoir 109, and then fed to the fuel mixer 106 and used for forming a mixed solution. The solenoid valve 111 provided between the moisture reservoir 109 and the fuel mixer 106 controls the feed rate of water fed to the fuel mixer 106 from the moisture reservoir 109. The solenoid valve 111 may be controlled by the controller 112 according to the methanol concentration detected by the concentration sensor 115 and the load 114. Opening or closing the solenoid valve 111 can be linked with the fuel mixer 106.

When the load 114 changes, information on the change of the load 114 is sent to the controller 112. The controller 112 controls the fuel mixer 106 so that the fuel cell 101 can achieve optimal power generation for the load 114, so that a mixed solution having an optimal methanol concentration for the load 114 is appropriately formed according to the conditions of power generation of the fuel cell and fed to the fuel cell.

Air discharged from the fuel cell 101 is fed to the gas-liquid separator 108. The gas-liquid separator 108 separates moisture contained in the air, and feeds the separated moisture to a moisture reservoir 109. The moisture stored in the moisture reservoir 109 is fed to the fuel mixer 106 while the flow rate of the moisture is controlled by the solenoid valve 111, and reused for the power generation of the fuel cell 101. The gas-liquid separator 108 feeds the air, from which moisture has been separated, to the treatment device 110, and the treatment device 110 discharges the exhaust out of the fuel cell apparatus 100. The gas-liquid separator 108, the moisture reservoir 109, and the fuel mixer 106 may be individually provided with a heater for preventing the residual moisture from freezing. Alternatively, for preventing the devices from suffering a damage due to frozen moisture, extra spaces may be formed individually in the gas-liquid separator 108, the moisture reservoir 109, and the fuel mixer 106. Further, by forming pipes constituting the fuel cell apparatus 100 from a material having elasticity, the pipes can be prevented from suffering a damage due to frozen moisture.

INDUSTRIAL APPLICABILITY

By the fuel cell apparatus of the present invention, power generation using a fuel having an optimal concentration for the output mode demanded by a fuel cell can be achieved, leading to efficient power generation with respect to the output of the fuel cell. Further, by the fuel cell apparatus of the present invention, the concentration of the fuel can be quickly changed to an optimal concentration in response to switching of the output mode demanded. Thus, the concentration of the fuel can be quickly changed to an optimal concentration according to the output mode demanded while continuing the power generation of the fuel cell. Accordingly, electric power can be generated always in such a state that the power generation efficiency is high.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A fuel cell apparatus comprising:
   a fuel cell for generating electric power using a liquid fuel; and
   a concentration adjusting means for adjusting a concentration of said liquid fuel to an optimal concentration according to an output mode demanded by said fuel cell, wherein:
   said concentration adjusting means comprises a plurality of fuel mixing means which form, respectively, liquid fuels each having a predetermined concentration.

2. A fuel cell apparatus comprising:
   a fuel cell for generating electric power using a liquid fuel; and
   a concentration adjusting means for adjusting a concentration of said liquid fuel to an optimal concentration according to an output mode demanded by said fuel cell, wherein:
   said concentration adjusting means comprises a plurality of fuel mixing means which form, respectively, liquid fuels each having a predetermined concentration; and
   from said plurality of fuel mixing means a fuel mixing means is selected for forming liquid fuel having an optimal concentration for said output mode.

3. The fuel cell apparatus as described in claim 1, wherein further comprising a concentration detecting means for detecting the concentration of said liquid fuel.

4. The fuel cell apparatus as described in claim 1, wherein:
   said concentration detecting means is provided at said plurality of fuel mixing means.

5. The fuel cell apparatus as described in claim 1, wherein:
   said concentration detecting means is provided between said fuel cell and said plurality of fuel mixing means.

6. A method for feeding a fuel for fuel cell comprising:
   detecting an output mode demanded by a fuel cell for generating electric power using a liquid fuel; and
   adjusting the concentration of said liquid fuel to an optimal concentration according to said output mode, wherein the concentration is adjusted by a concentration adjusting means including a plurality of fuel mixing means which form, respectively, liquid fuels each having a predetermined concentration.

7. The method of claim 6, wherein:
   from said plurality of fuel mixing means a fuel mixing means is selected for forming liquid fuel having an optimal concentration for said output mode.

* * * * *